July 2, 1929.  A. W. SCOTT ET AL  1,719,026
HANDWHEEL
Filed Dec. 8, 1922   3 Sheets-Sheet 1

Witnesses.

Inventor:
Alva W. Scott
Harvey D. Geyer
Ralph H. Chilton
Their Attorney.

Inventor.
Alva W. Scott
Harvey D. Geyer
By Ralph W. Chilton
their Attorney.

Patented July 2, 1929.

1,719,026

UNITED STATES PATENT OFFICE.

ALVA W. SCOTT AND HARVEY D. GEYER, OF DAYTON, OHIO, ASSIGNORS, BY MESNE ASSIGNMENTS, TO THE INLAND MANUFACTURING COMPANY, OF DAYTON, OHIO, A CORPORATION OF DELAWARE.

HANDWHEEL.

Application filed December 8, 1922. Serial No. 605,546.

This invention relates to handwheels and particularly to the type ordinarily employed as a steering wheel for motor vehicles, airplanes and motor boats.

The present invention has for an object the provision of a wheel having wooden spokes which are so attached to the rim and the central hub as to form a very neat, strong, and yet simple construction.

A more specific object is the improved method of attaching the rigid spider within recesses cut in the rim whereby the additional plugs ordinarily employed are not required to completely fill the recesses cut into the rim for the reception of the spider arms.

Further objects and advantages of the present invention will be apparent from the following description, reference being had to the accompanying drawings, wherein preferred forms of embodiment of the present invention are clearly shown.

In the drawings.

In the drawings, like or similar reference characters refer to like or similar parts throughout the several views.

Figure 1:
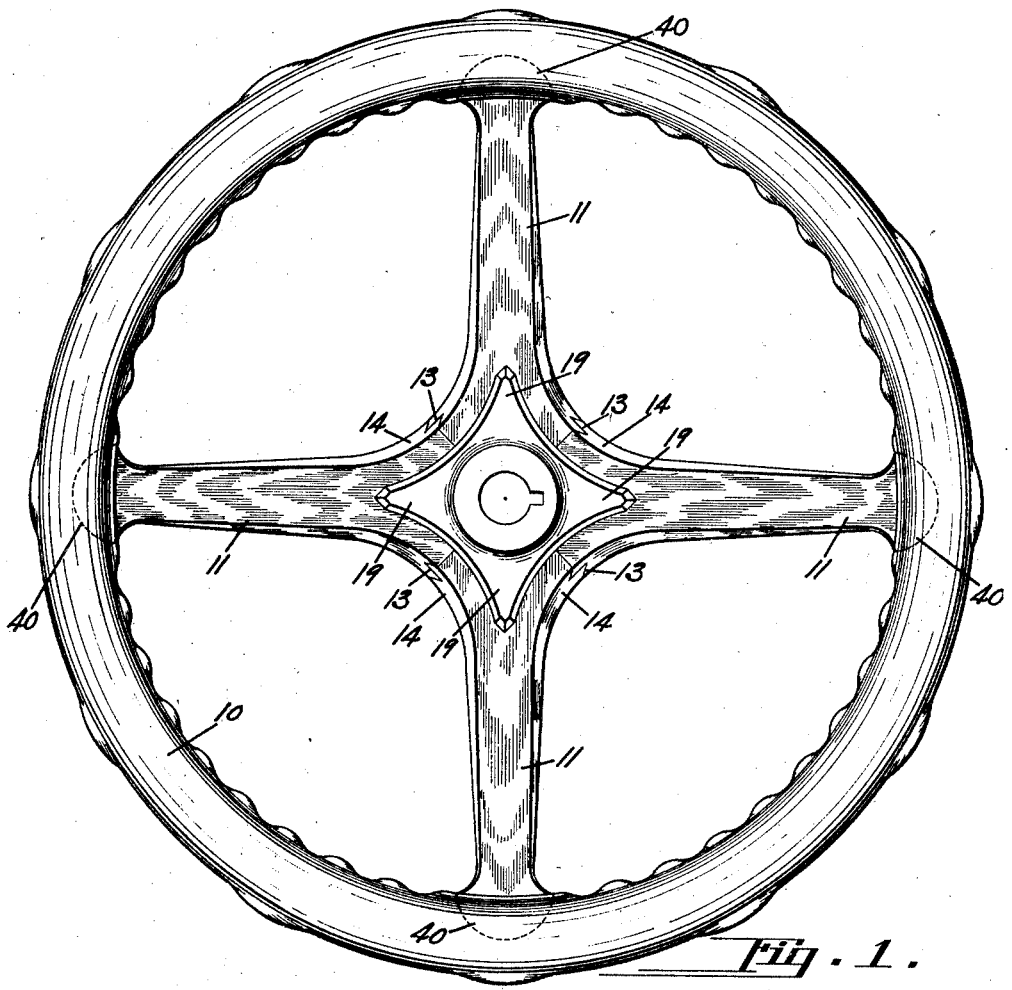
Fig. 1 is a top view of a steering wheel built according to this invention.
Figure 2:
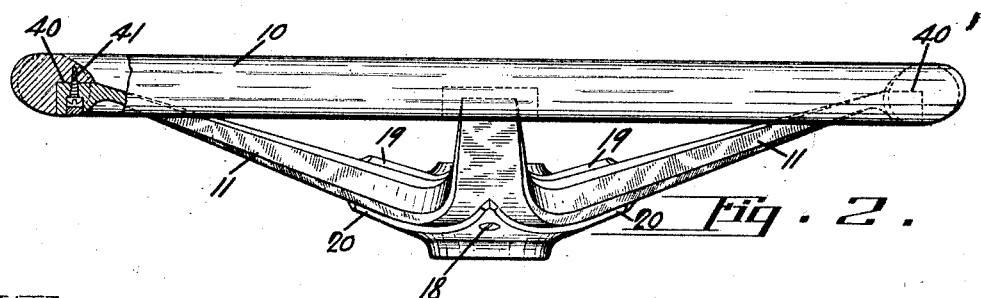
Fig. 2 is a side elevation of the same but showing in section the manner of attaching the spokes to the rim.

Numeral 10 designates the rim which is preferably made of wood but may be made of any other suitable material and may have a smooth surface or any desired kind of corrugated surface. The wooden spokes 11 have their inner ends 12 enlarged as clearly illustrated so that when these inner ends are rigidly secured together by means of the scarf joints 13 and glued they form a wooden hub portion which is very strong and rigid. Preferably the separate spokes 11 are joined together by means of this scarf joint before being finally shaped, and then after the glue has thoroughly dried the arcs 14 are rounded out and the corners either rounded or chamfered, as desired, by any suitable means. Instead of using the scarf joint as shown in the drawings any form of joint may be used wherein the abutting surfaces of two adjacent spokes are cut to mutually intermesh or interengage. This construction permits a very strong glued connection and avoids the necessity of using a separate spline connection which is often used in such wheels.

Figure 3:
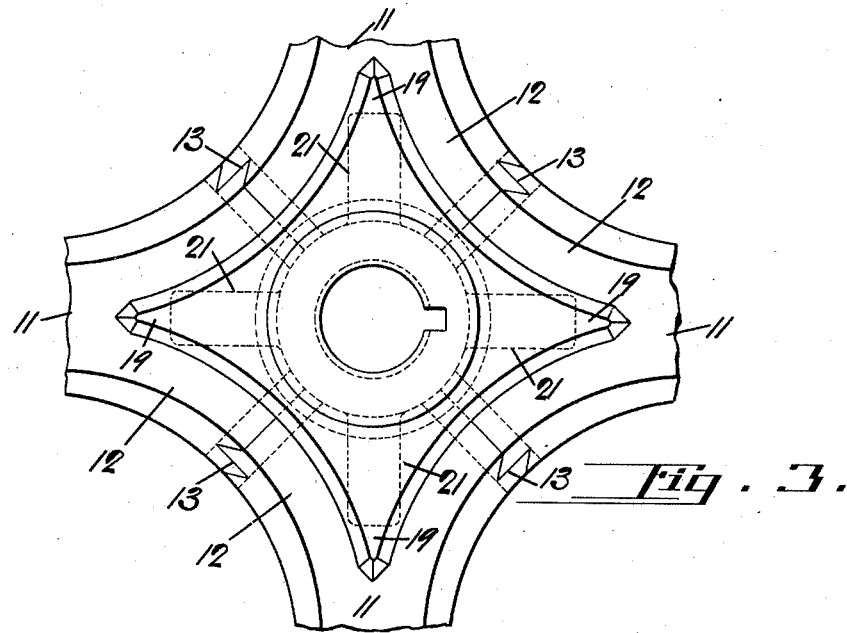
Fig. 3 is a top view of the hub portion on an enlarged scale and shows in dotted lines the scarf joint between the inner ends of the wooden spokes.

A metallic hub 15 is provided for attaching the wheel to a shaft and to further secure the inner ends of the spokes together. This hub comprises a sleeve portion 15, which is adapted to be keyed or otherwise suitably fixed to the shaft to be driven by the handwheel, and two flanges 16 and 17 lying on opposite sides of the wooden hub and serving to rigidly clamp the wooden hub to sleeve 15. One of these flanges, preferably the top one 16 as shown in the drawings, is made integral with sleeve 15 while the other flange slides over the lower end of sleeve 15 and is clamped to the upper flange by means of the screws 18. These screws 18 preferably pass upwardly from below and do not extend entirely through the upper flange 16 (see Fig. 4) thus presenting a much neater view from above. In order to permit the screws 18 to be placed a greater distance from the inner end of the spokes 11 the flanges 16 and 17 are preferably provided with projecting portions 19 and 20 which extend out along each of the wooden spokes 11. The top flange 16 is also provided on its under surface with radially extending lugs or webs 21 (see Figs. 3 and 4) which seat in corresponding recesses formed in the wooden spokes 11. The star-shaped form of the upper and lower flanges 16 and 17 permit the lugs 21 as well as screws 18 to be located at a greater distance from the center of the wheel and are thus in a very much more efficient position for carrying the torque of the handwheel from the wooden hub to the metallic hub. Of course if desired the lugs 21 could be located on the lower flange 17 instead of as shown, or such lugs could be put on both flanges. The lugs 21 also serve as convenient bosses for receiving the threaded end of the screws 18.

The drawings illustrate the projections 19 and 20 forming with the flanges 16 and 17 simple star shapes but this is merely a matter of design and the contour of these projections may be varied to suit the designer's taste.

Figure 4:
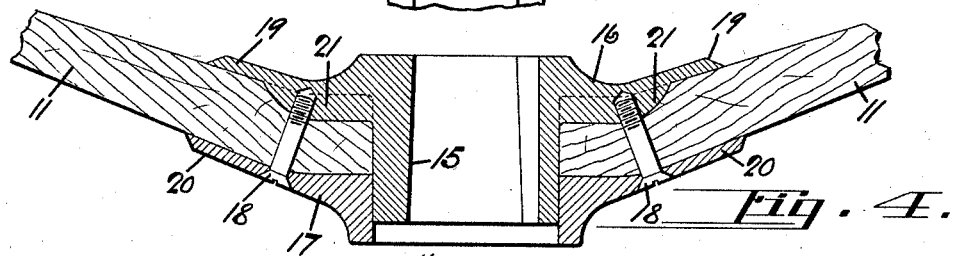
Fig. 4 is a vertical section through the centre line of Fig. 3.
Figure 5:
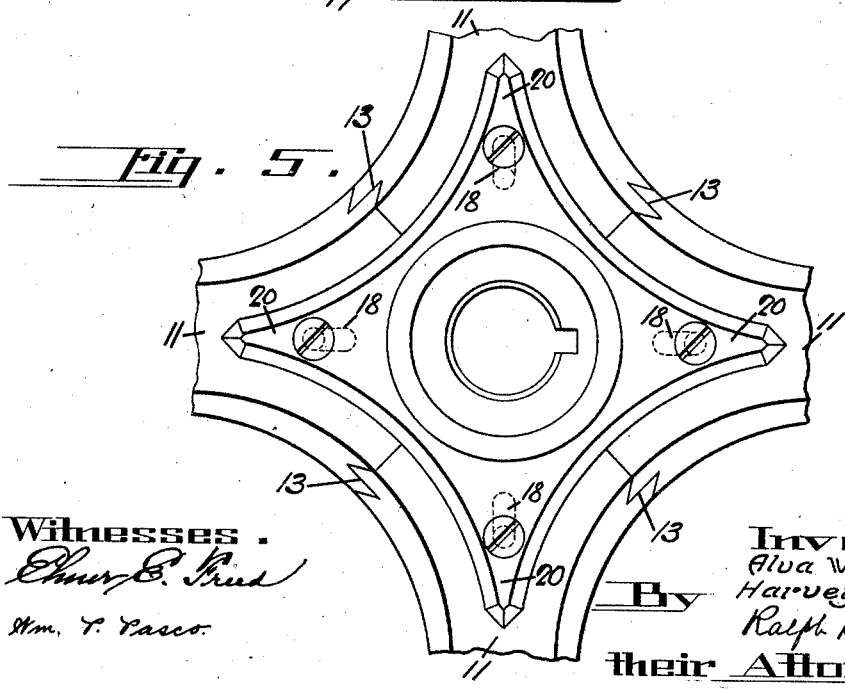
Fig. 5 is a bottom view of the hub portion.
Figure 6:
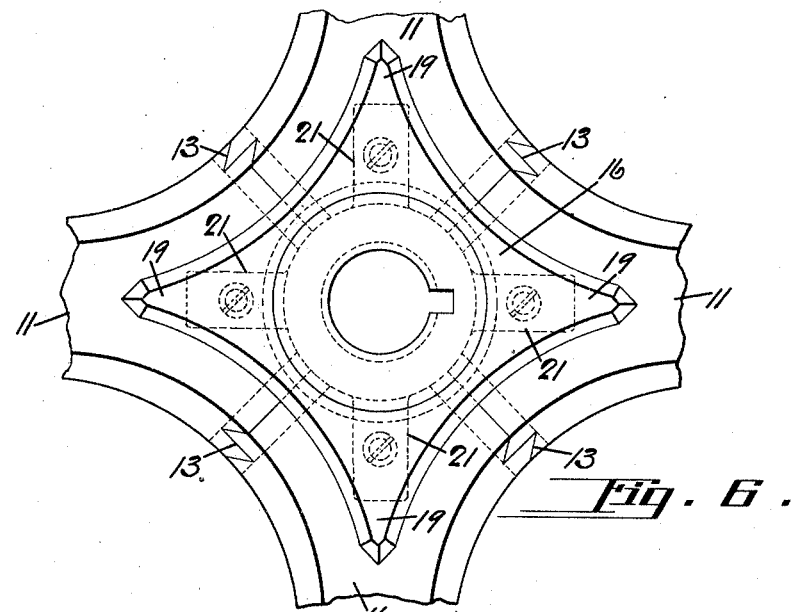
Figs. 6, 7 and 8 are views similar to Figs. 3, 4 and 5 but show a modified form of hub wherein the bottom flange is not provided with projections extending on the under side of each spoke.
Figure 7:
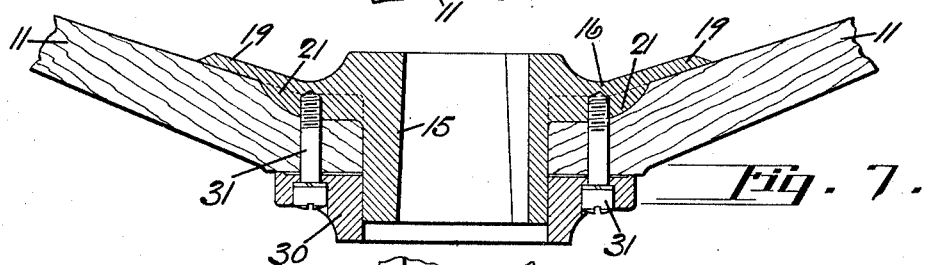
Figure 8:
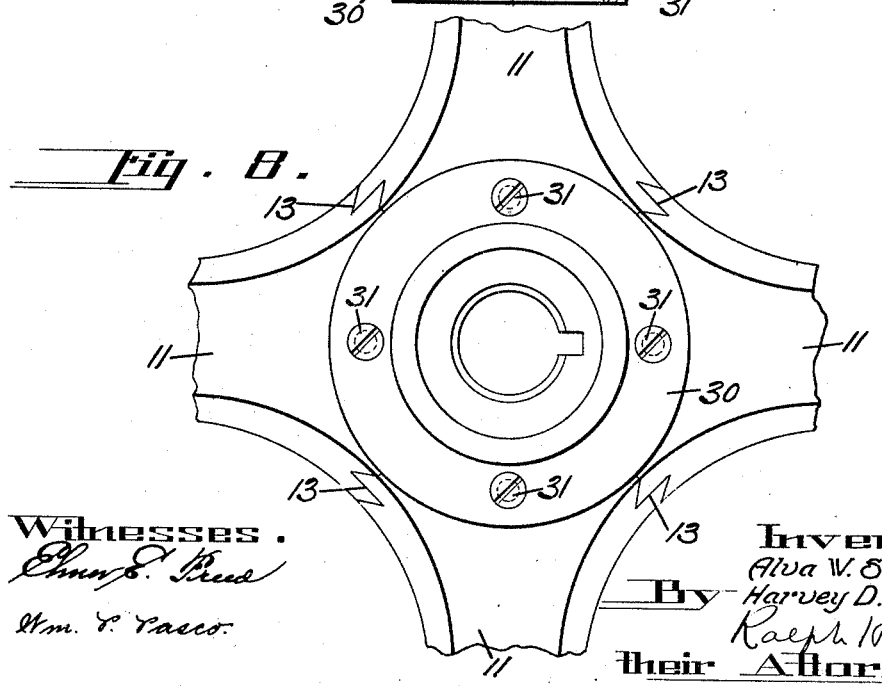

In the modification shown in Figs. 6, 7 and 8 the lower flange 30 is round instead of star-shaped, the diameter of this flange being considerably greater than the short diameter of the upper flange 16 to permit the screws 31 to be located further from the center of the wheel. The upper flange being star-shaped permits a greater area of the wooden hub to remain uncovered and hence presents a neater appearance, but as the under side of a steering wheel is not exposed to view the bottom flange may be made of larger diameter and round instead of star-shaped. The screws 31 preferably extend parallel to the wheel axis, but if desired they may extend angularly as shown in Fig. 4.

In assembling the handwheel according to this invention the wooden spider is first rigidly assembled before being inserted in the rim. The recesses 40 corresponding to the shape of the outer ends of the spokes are cut in the rim, preferably to approximately half the depth of the rim, and the spider dropped into these recesses 40 from the under side. The ends of the spokes 11 are made to fit snugly within the recesses 40 in plan view but are enlarged to project slightly above the outer contour of the rim. After the spokes have been secured to the rim by the countersunk screws 41, or by other suitable means, the projecting part of the enlarged ends is cut down to lie flush with and form part of the contour of the rim 10. The enlarged ends on the spokes 11 does away with the separate wooden filling plugs ordinarily employed to fill in these recesses and also makes a much stronger connection due to the greater bearing area between the end of the spoke and rim.

While the forms of mechanism herein shown and described, constitute preferred forms of embodiment of the present invention it is to be understood that other forms might be adopted, all coming within the scope of the claims which follow.

What we claim is as follows:

1. In a handwheel having a spider having wooden spokes, a metallic hub including, a sleeve adapted to be secured to a shaft, a star-shaped flange integral with said sleeve lying on one side of said spokes, each of said star points extending along a wooden spoke, and means for rigidly clamping each of said spokes to said star points.

2. In combination with a handwheel having wooden spokes and a wooden hub portion, means for securing same to a shaft comprising, a sleeve adapted to fit over the shaft and be fastened thereto, a star-shaped flange integral with said sleeve lying adjacent the wooden hub, each of said star points extending along a wooden spoke, a second flange non-integral but concentric with said sleeve, and means for clamping the wooden hub portion rigidly between said flanges.

3. In combination with a handwheel having wooden spokes and a wooden hub portion, means for securing same to a shaft comprising a sleeve adapted to fit over the shaft and be fastened thereto, a star-shaped flange integral with said sleeve lying adjacent the wooden hub, each of said star points extending along a wooden spoke, a second flange non-integral but concentric with said sleeve, and means for clamping the wooden hub portion rigidly between said flanges, said clamping means comprising screw bolts extending through said second flange and wooden hub and into said star-shaped flange.

4. In combination with a handwheel having wooden spokes and a wooden hub portion, means for securing same to a shaft comprising, a sleeve adapted to fit over the shaft and be fastened thereto, a star-shaped flange integral with said sleeve lying adjacent the wooden hub, each of said star points extending along a wooden spoke, a second flange non-integral but concentric with said sleeve, and means for clamping the wooden hub portion rigidly between said flanges, said clamping means comprising bolts or the like extending between the two flanges.

5. In a handwheel having a wooden hub, means for rigidly securing same to a shaft comprising, a metallic hub adapted to fit within the wooden hub and having a flange integral therewith lying on one side of the wooden hub, a separate metallic flange member concentric with said hub and lying on the opposite side of said wooden hub, and screws passing through said separate flange member and wooden hub and into concealed threaded recesses in the integral flange whereby the wooden hub is rigidly clamped to the metallic hub.

6. In a handwheel having a wooden hub, means for rigidly securing same to a shaft comprising, a metallic hub adapted to fit within the wooden hub and having a star-shaped flange integral therewith lying on one side of the wooden hub, a separate metallic flange member concentric with said hub and lying on the opposite side of said wooden hub, and screws passing through said separate flange member and wooden hub and into concealed threaded recesses in the integral flange whereby the wooden hub is rigidly clamped to the metallic hub.

7. In combination with a handwheel having wooden spokes and a wooden hub portion, means for securing same to a shaft comprising; a sleeve adapted to be secured to said shaft, a flange rigid with said sleeve and lying adjacent the wooden hub and having thickened portions projecting into recesses in said wooden hub, a metallic ring lying opposed to said flange on the opposite side of the wooden hub, and threaded screws passing through said ring and wooden hub and into said thickened portions for clamping said parts together.

8. In combination with a handwheel having wooden spokes and a wooden hub portion, means for securing same to a shaft comprising; a sleeve adapted to be secured to said shaft, a star-shaped flange rigid with said sleeve and lying adjacent the wooden hub and having thickened portions projecting into recesses in said wooden hub, a metallic ring lying opposed to said flange on the opposite side of the wooden hub, and threaded screws passing through said ring and wooden hub and into said thickened portions for clamping said parts together.

9. Means for securing a wooden hub to a shaft, including, a metallic sleeve adapted to be rigidly secured to said shaft, a flange integral with said sleeve and lying adjacent the wooden hub, a metallic ring member lying opposed to said flange on the opposite side of said wooden hub, and clamping screws passing through said ring member and hub angularly toward the center and into said flange.

10. A steering wheel comprising a continuous self sustaining rim of wood having a surface curved in section, a plurality of wooden spokes of materially greater width than thickness entering and secured to said rim at their outer ends and extending inwardly on radial lines and at an angle to the plane of the rim, the said spokes having laterally enlarged inner ends mutually abutting one another and rigidly joined together at their abutting surfaces by interengaging teeth formed in the stock of said spokes and held together by adhesive means, said teeth being so shaped that all their contacting surfaces are pressed tightly together by inward radial pressure upon the spokes whereby a stronger glued joint is obtained.

In testimony whereof we hereto affix our signatures.

ALVA W. SCOTT.
HARVEY D. GEYER.